(12) United States Patent
Vodopyanov

(10) Patent No.: US 6,535,327 B1
(45) Date of Patent: Mar. 18, 2003

(54) CGA OPTICAL PARAMETRIC OSCILLATOR

(75) Inventor: Konstantin Vodopyanov, Alpine, NJ (US)

(73) Assignee: Picarro, Inc., Sunnyvale, CA (US)

(*) Notice: Subject to any disclaimer, the term of this patent is extended or adjusted under 35 U.S.C. 154(b) by 0 days.

(21) Appl. No.: 09/567,908

(22) Filed: May 10, 2000

Related U.S. Application Data

(60) Provisional application No. 60/179,646, filed on Feb. 2, 2000.

(51) Int. Cl.[7] .............................. G02F 1/39; H01S 3/109
(52) U.S. Cl. .......................................... 359/330; 372/22
(58) Field of Search ................................ 359/326–332; 372/21–22

(56) References Cited

U.S. PATENT DOCUMENTS

| | | | | |
|---|---|---|---|---|
| 4,011,462 A | * | 3/1977 | Piltch et al. | 359/326 |
| 4,107,544 A | * | 8/1978 | Kildal et al. | 359/327 |
| 4,450,356 A | * | 5/1984 | Murray et al. | 250/339.11 |
| 4,955,699 A | * | 9/1990 | Singh et al. | 359/285 |
| 5,110,430 A | * | 5/1992 | Eerkens | 204/157.2 |

OTHER PUBLICATIONS

Vodopyanov et al, "Two–Photon Absorption in GaSe And CdGeAs2", Summaries Of Papers Presented At The Conference On Lasers And Electro–Optics 1999 (CLEO '99), Baltimore MD (USA), pp. 477–478, May 23–28, 1999.*

Schunemann, "Growth of CdGeAs2 for Mid–to Far–IR Frequency Conversion", 1996 Quantum Electronics and Laser Science Conference (QELS '96), paper Tu14, pp. 94–95, Jun. 1996.*

Vodopyanov et al, "Efficient Difference–Frequency Generation of 7–to 20μm Radiation Using CdGeAs2", 1998 Conference on Lasers and Electro–Optics (CLEO '98), paper CFC7, p. 509, May 1998.*

* cited by examiner

*Primary Examiner*—John D. Lee
(74) *Attorney, Agent, or Firm*—Stroock & Stroock & Lavan LLP

(57) ABSTRACT

An optical parametric oscillator and a laser system including an optical parametric oscillator is provided for producing widely tunable coherent light over about 6 μm, such as in the range of at least about 7 μm to 18 μm range. Optical parametric oscillators in accordance with the invention advantageously include $CdGeAs_2$ (CGA) crystals. Such crystals, in accordance with the invention can exhibit exceptionally small (<0.1 cm$^{-1}$) losses in intensity. Laser systems in accordance with the invention can include frequency-doubled $CO_2$ lasers as the pump beam and frequency doublers or changers, based on CGA crystals.

24 Claims, 3 Drawing Sheets

CGA OPTICAL PARAMETRIC OSCILLATOR

CROSS REFERENCE TO RELATED APPLICATIONS

This application is a continuation-in-part of provisional Ser. No. 60/179,646, filed Feb. 2, 2000, the contents of which are incorporated herein by reference.

BACKGROUND OF THE INVENTION

The invention relates generally to optical parametric oscillators and particularly to laser systems comprising optical parametric oscillators.

Wavelength tunable laser systems are frequently constructed with optical parametric oscillators. Optical parametric oscillators are commonly constructed with a crystal having nonlinear optical properties disposed between two mirrors, referred to as an optical cavity. Referring generally to FIG. 1, an optical parametric oscillator can include an optical cavity 10 comprising two parallel plane mirrors 20a and 20b, whose surfaces are treated to be reflective or transmissive, based on the wavelength of incident light. A nonlinear crystal 30 is disposed between mirrors 20a and 20b. In operation, a laser beam 40, referred to as the pump or pumping laser beam, passes through the back of first mirror 20a and into nonlinear crystal 30. Nonlinear crystal 30 converts laser beam 40 into two coherent waves of a signal frequency ($f_s$) and a complementary or idler frequency ($f_i$), such that the frequency ($f_p$) of pump laser beam 40 is equal to the signal frequency plus the idler frequency ($f_p = f_s + f_i$)

Simple optical parametric oscillators can be constructed so that the inner facing surfaces of mirrors 20a and 20b are treated to reflect the signal beam. The inner surface of first mirror 20a is generally treated to reflect the idler beam. However, the inner surface of second mirror 20b is generally treated to transmit the idler beam outside of the optical cavity. Alternatively, optical parametric oscillators can be constructed in a "doubly resonant configuration", in which the mirrors are treated to completely reflect one of the beams (i.e., the signal beam) completely and second mirror 20b is constructed to transmit one of the beams (i.e., the idler beam) only partially and to reflect a portion of the idler beam back into the crystal. This "doubly resonant" configuration permits the use of pump beams with a lower intensity, while still achieving sufficient optical activity by the nonlinear crystal and transmitting an appropriate wave from the optical cavity.

When an appropriate crystal 30 with appropriate birefringence properties is selected, the frequency of the beam emitted by the OPO can be tuned by adjusting the orientation of the optical axis (crystalline axis) of crystal 30 with respect to the optical axis of the OPO. In alternative embodiments, two or more nonlinear crystals can be used in place of single crystal 30.

Optical parametric oscillators can have drawbacks. For example, the longwave tuning range of existing OPOs has generally been limited to the 4 to 5 $\mu$m range. This is not suitable for many scientific applications.

Accordingly, it is desirable to provide a laser system including an optical parametric oscillator which can emit beams that are widely and easily tunable within desired frequency bands and are of a relatively low power. It is also desirable to provide a laser system including an optical parametric oscillator which overcomes other drawbacks and deficiencies of the prior art.

SUMMARY OF THE INVENTION

Generally speaking, in accordance with the invention, an optical parametric oscillator and a laser system including an optical parametric oscillator, is provided for producing widely tunable coherent light over about 6 $\mu$m, such as in the range of at least about 7.5 $\mu$m to 16 $\mu$m and even about the 7 to 18 $\mu$m range. Optical parametric oscillators in accordance with the invention advantageously include $CdGeAs_2$ (CGA) crystals. When grown properly, such crystals, in accordance with the invention, can exhibit exceptionally small (<0.1 $cm^{-1}$) losses in intensity. Laser systems in accordance with the invention can include $CO_2$ lasers as the pump beam and frequency doublers or changers, such as CGA crystals.

Accordingly, it is an object of the invention to provide improved optical parametric oscillators.

Another object of the invention is to provide improved wavelength tunable laser systems.

Another object of the invention is to provide an improved method of making an optical parametric oscillator and laser system.

The invention accordingly comprises the features of construction, combinations of elements, and the arrangements of parts and the steps for effecting the foregoing, and the scope of the invention will be indicated in the claims.

BRIEF DESCRIPTION OF THE DRAWINGS

For a fuller understanding of the invention, references had to be following description, taken in connection with the accompanying drawings, in which.

DETAILED DESCRIPTION OF THE PREFERRED EMBODIMENTS

Figure 1:
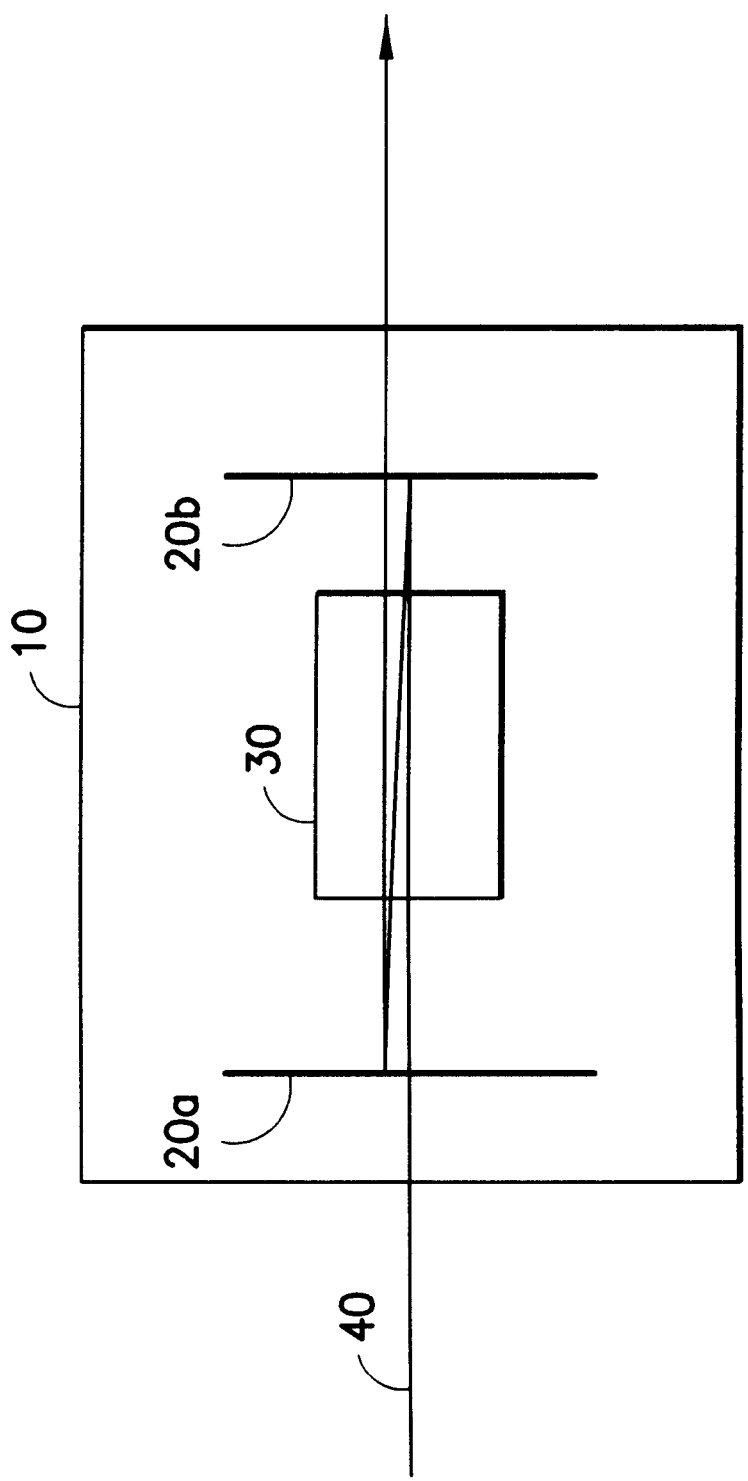
FIG. 1 is a schematic representation of the general construction of an optical parametric oscillator.
Figure 2:
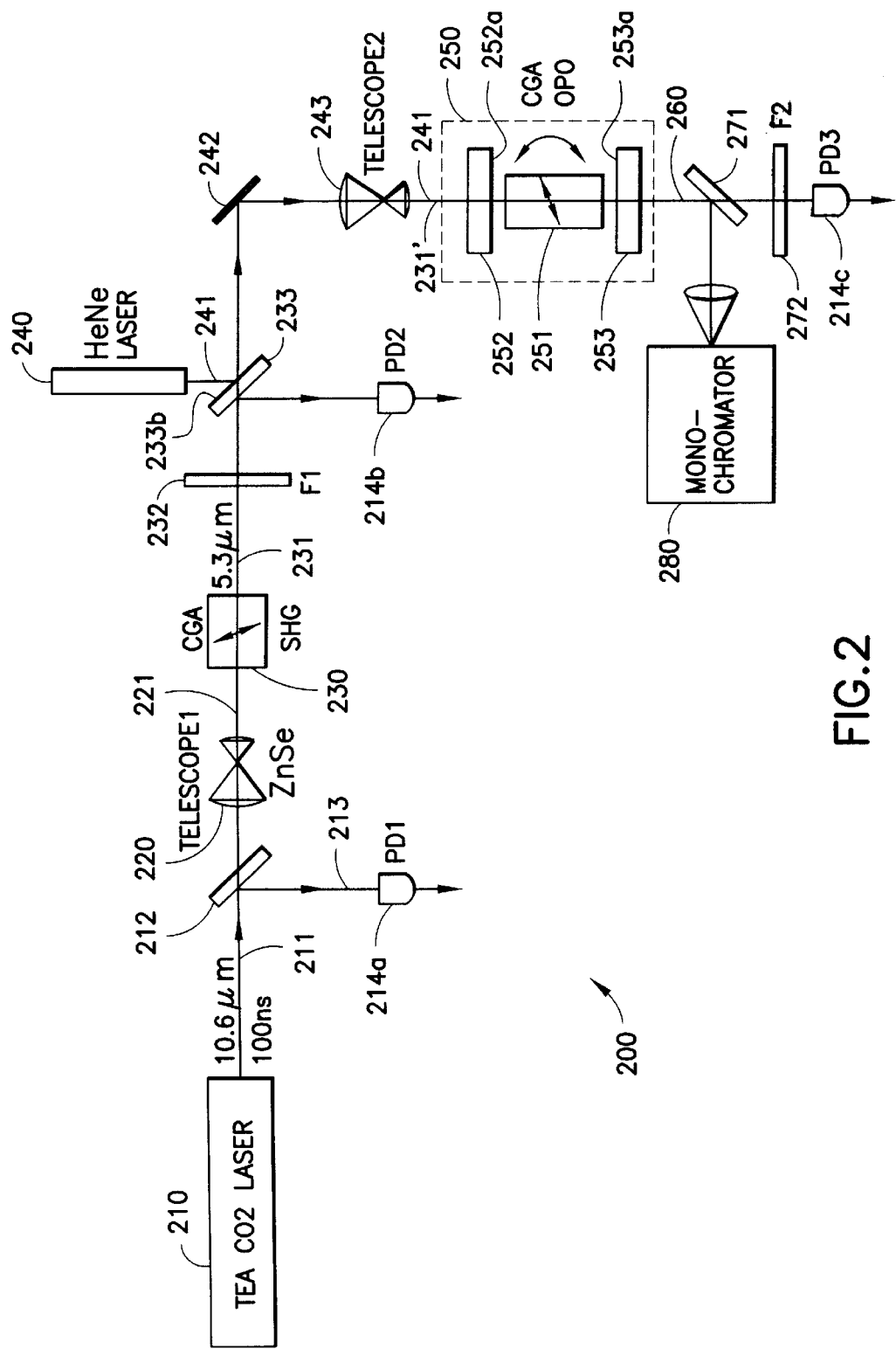
FIG. 2 is a schematic representation of a wavelength tunable laser system including an optical parametric oscillator, in accordance with preferred embodiments of the invention.

A laser system including an optical parametric oscillator for producing widely tunable waves in the mid IR region, in accordance with preferred embodiments of the invention, is shown generally as laser system 200 in FIG. 2.

Laser system 200 includes a TEA $CO_2$ pump laser 210 which emits a beam 211 at a wavelength of 10.6 $\mu$m. In one preferred embodiment, the laser emits 100 ns pulses every 1–10 ms and has a peak power of $10^5$ W and a beam spot diameter of 2 mm. Laser 210 projects beam 211 at a first partially reflective beam splitting dichroic mirror 212. Beam splitting mirror 212 reflects a beam 213, which is split from beam 211, at a first photo detector 214a for monitoring the $CO_2$ laser pulses.

The portion of beam 211 transmitted through partially reflective mirror 212 is received by a ZnSe telescope 220, for focusing beam 211 and adjusting the beam size and laser power density. In a preferred embodiment of the invention, the beam spot is focused to a diameter of 1 mm and an intensity of 60 $MW/cm^2$. A focused beam 221 is received by a second harmonic generating CGA crystal 230. CGA crystal 230 doubles the frequency of beam 221, leading to the emission of beam 231, having 5.3 $\mu$m wavelength. Beam 231 passes through a short pass filter 232 which blocks the fundamental 10.6 $\mu$m $CO_2$ laser radiation beam and permits transmission of frequency doubled beam 231 with a wavelength of 5.3 $\mu$m. In alternative embodiments of the invention, the pump beam and/or crystal 230 can be changed to provide a pump beam of a different wavelength. In certain embodiments of the invention, crystal 230 can be omitted altogether and the pump beam from the pump laser can be directed without modification into the OPO. A frequency doubled pump laser emitting in the range of 4 to 6 μm is advantageous.

In a preferred embodiment of the invention, the oriented crystals are cut and lapped to produce elements with 6×8 mm² in cross-section and 10–15 mm long, with the polar angle θ=34°, and azimuthal angle ψ=0°. The entrance and exit faces of the crystals should be highly polished. Then, a broad-band AR coating can be applied to reduce the reflection losses to <1% per face in the spectral range of 5 to 12 μm. The coatings should be prepared with ion assisted E-beam deposition or ion sputtering in order to increase density of the coating and reduce its porosity.

After beam 231 passes through crystal 230, it is directed at a beam splitting mirror 233 which reflects a portion of beam 231 to a second photo detector beam 214b to monitor the frequency doubled laser pulses.

An HeNe laser 240 reflects a beam 241 off the back surface 233b of mirror 233 in a direction parallel and overlapping with beam 231 to a mirror 242, which reflects beam 231 and beam 241 into a telescope 243 which is used to adjust the beam size and the laser power density of beam 231, to yield a focused beam 231' and transmits combined beams 231' and 241 into an optical parametric oscillator 250. The HeNe laser is used to align the elements of system 200 and can be omitted. In one embodiment of the invention, focused beam 231' has an intensity of 20 MW/cm², and a spot diameter of 1 mm.

Optical parametric oscillator 250 includes a CGA crystal 251 between a first mirror 252 and a second mirror 253. OPO crystal 251 splits beam 231 into a short wavelength signal beam and a long wavelength idler beam. An inner surface 252a of first mirror 252 is advantageously reflective in the spectral range covering the wavelength of pump beam 231 as well as both the signal beam and the idler beam, so that the nonlinear interaction of the three beams continues on the return pass. This lowers the oscillation threshold and increases conversion efficiency. An inner surface 253a of second mirror 253 is advantageously reflective of the wavelength of pump beam 231" and the signal beam emerging from crystal 251 and transparent or partially transparent and partially reflective of the idler beam and emits an idler beam 260 from optical parametric oscillator 250. Idler beam 260 is directed at a beam splitting mirror 271 and a portion of beam 260 is passed through a long pass filter 272, to transmit at a wavelength greater than 5.3 μm, corresponding to the output of optical parametric oscillator 250, to a third photo detector 214c for monitoring the output pulses from OPO 250. The reflected portion is directed to a monochromator 280.

In one preferred embodiment of the invention, idler beam 250 can be characterized as follows:

Expected quantum conversion efficiency: 15–20%
Expected OPO energy (near 10–12 μum): 1 mJ;
peak power: $10^4$W
beam diameter 1 mm
power density (intensity)~10 MW/cm2
First mirror 252 is preferably highly transmissive (greater than 95 percent) of pump beam 231'. Inner surface 252a of input mirror 252 is preferably, highly reflective (greater than 95 percent) at both the signal wavelength and at the idler wavelength. Inner surface 253a of second mirror 253 is preferably highly reflective (greater than 95 percent) at the pump wavelength, highly reflective (greater than 95 percent) at the signal wavelength and highly transmissive (greater than 80 percent) at the idler wavelength.

Laser systems including OPOs in accordance with the preferred embodiments of the invention are highly advantageous sources of coherent beams for achieving mid-IR radiation, which is tunable over a wide range (more than one octave) of frequencies, with quantum conversion efficiencies exceeding 15 percent and even exceeding 20 percent. The long wave tuning range of OPOs in accordance with preferred embodiments of the invention can be in the various ranges over 6 μm, such as within or substantially completely spanning wavelengths from about 7 to 18 μm.

Preferred crystals for the OPO include $CdGeAs_2$ (CGA), which has been determined to have the most preferred optical properties. It remains transparent to wavelengths up to 18 μm and has an exceptionally high nonlinear coefficient of (236 pm/V). New techniques of growing CGA crystals result in crystals having less than 0.1 cm$^{-1}$ losses in beam intensity. Crystal growth techniques are reported at P.G. Schunemann, in Conference on Lasers and Electro-Optics, Vol. 9, p. 230 (1996), OSA Technical Digest Series (Optical Society of America), U.S. Pat. No. 5,611,856 and Schunemann et al., J. Cryst. Growth (174) 272 (1997). The use of $CdGeAs_2$ crystals for affecting laser beam frequency is discussed in Vodopyanov, et al., Optics Letters, Vol. 23, No. 14, Jul. 15, 1998, which describes directing a beam output from a $ZnGeP_2$ crystal double pass optical parametric generator through a CGA crystal. The contents of these references are incorporated herein by reference.

It has been determined that a tunable laser system including a CGA optical parametric oscillators in accordance with the invention can have advantages over systems including optical parametric generators, such as those having $ZnGeP_2$ crystals in the optical cavity as discussed in the Vodopyanov article discussed above. First, the superior optical properties of CGA crystals compared to $ZnGeP_2$ crystals lead to advantages in terms of wide band tuning, when such crystals are included in the optical cavity, which are not exhibited by $ZnGeP_2$ crystals. Furthermore, OPO systems in accordance with the invention require only one wavelength for the pump and wavelength tuning is achieved simply by rotating the CGA crystal. The Difference Frequency Generation setup requires outputting two beams from the other laser source, one of which is tunable. This leads to a complicated design because two beams with two different frequencies are required and they must overlap in space and time. The OPO resonant structure also leads to higher conversion efficiencies. None of these advantages are apparent from the article cited above.

The use of a frequency doubled output ($\lambda \cong 5.3$ gm) of a $CO_2$ laser is advantageous. The 5.3 μm wavelength is sufficiently far from the CGA crystal's short-wave absorption cut-off (2.3 μm) and thus absorption at 5.3 μm can be relatively small. ($\alpha \cong 0.2$ cm$^{-1}$) The choice of a frequency doubled $CO_2$ laser is also advantageous because the quantum defect, which is determined by the difference between the pump and the OPO output photon energies, is relatively small. This is because of the longwave, 5.3 μm pump is not far (in the sense of the photon energy) from the 7 to 18 μm tunable range. Also, there is no two-photon absorption at 5.3 μm for this same reason. Also, $CO_2$ lasers have high wall plug efficiency. Frequency doubled lasers emitting in about the 4 to 6 μm range can also be acceptable.

Laser systems including optical parametric oscillators in the accordance with the invention, which are tunable in the mid IR range of 7.5 to 16 and even 7 to 18 μm are extremely advantageous for the analysis and detection of gases. Many gases absorb at this wavelength and the detection of specific gases can be readily effected by analyzing the spectrum emitted through the gas, as the laser system is tuned through the 7 to 18 μm band. For example, the following gases absorb in this band and can be detected with a laser system in accordance with this invention: CO, $CO_2$, $N_2O$, $NO_2$, $CCl_4$, Mustard gas, chloroform and others. Furthermore, the 8 to 12 μm window of atmospheric transparency is encompassed by this range.

Figure 3:
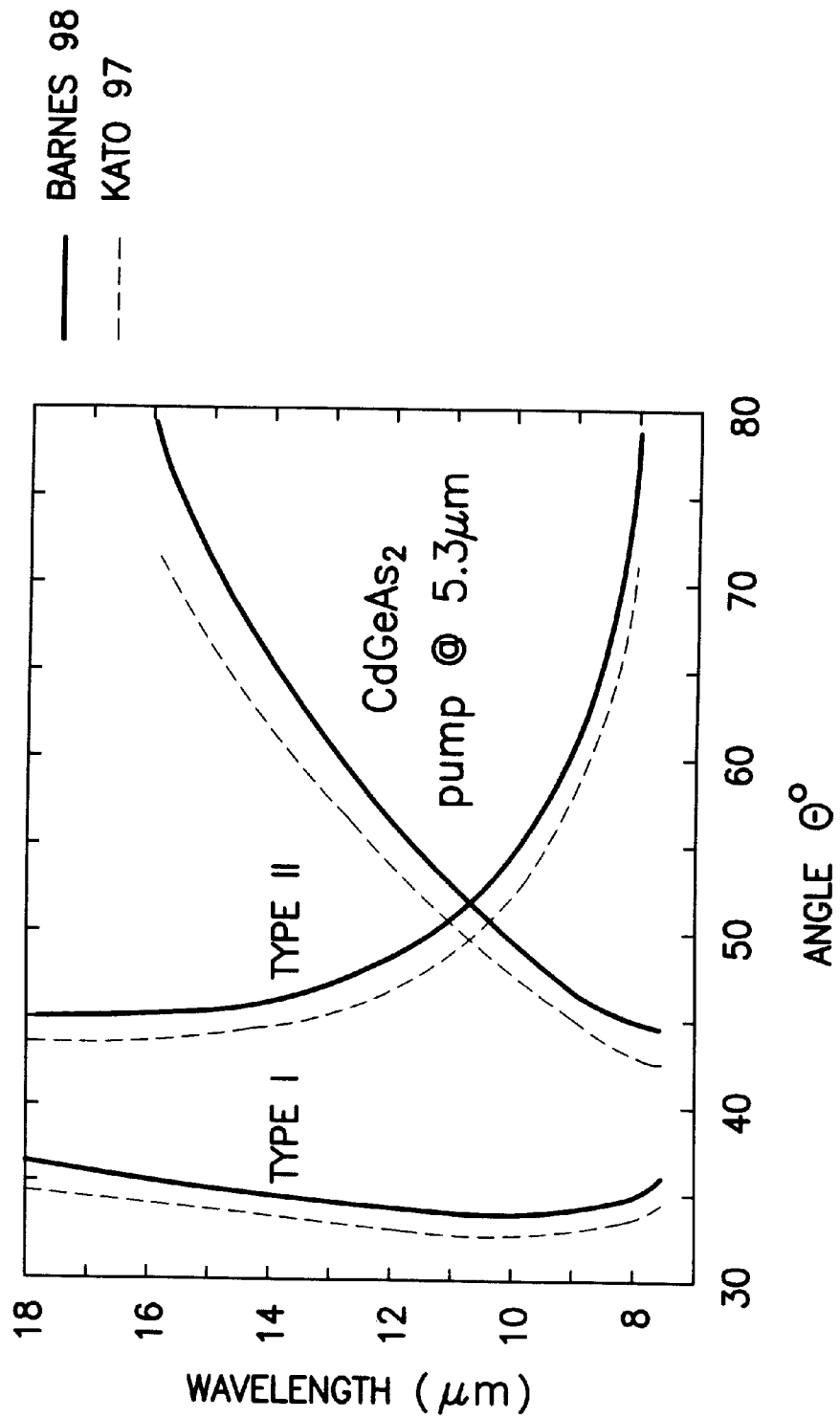
FIG. 3 is a graph showing the change in wavelength with angle for OPOs constructed in accordance with preferred embodiments of the invention.

Theoretical CGA OPO angular tuning curves, corresponding to the 5.3 μm pump wavelength which can be achieved with laser systems including optical parametric oscillators in accordance with preferred embodiments of the invention are shown in FIG. 3. The two sets of curves are calculated from the two known dispersion relations. Both type I and type II phase matching can be used with FIG. 3. In the case of Type I, the effective nonlinearly $d_{eff} \cong \sin 2\theta$ is 1.25 times larger than in the case of Type II, near $\theta \cong 48°$ (in this case $d_{eff} \cong \sin 2\theta$). However, Type II provides narrower OPO linewidths, especially toward the degeneracy point.

It will thus be seen that the objects set forth above, among those made apparent from the preceding description are efficiently attained and, since certain changes can be made in carrying out the above method and in the constructions set forth without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, has a matter of language, might be said to fall therebetween.

What is claimed is:

1. A laser system, comprising:
   an optical parametric oscillator, comprising a resonant optical cavity having an optical axis;
   a pump beam source constructed and arranged to emit a pump beam into the resonant optical cavity, along the optical axis thereof;
   at least one $CdGeAs_2$ crystal having a crystalline axis and capable of producing parametric oscillations, positioned in the optical axis of the cavity in such a manner that the at least one $CdGeAs_2$ crystal can be rotated in the plane containing the optical axis of the cavity and the crystalline axis of the at least one crystal.

2. The laser system of claim 1, wherein at least one nonlinear crystal can tune the wavelength of a beam exiting the cavity substantially continuously over the range of about 8 to 12 μm.

3. The laser system of claim 1, wherein the at least one nonlinear crystal can tune the wavelength of a beam exiting the cavity substantially continuously from 7 to 18 μm.

4. The laser system of claim 1, wherein the crystal exhibits an optical loss of intensity of less than about 0.1 $cm^{-1}$.

5. The laser system of claim 1 wherein the pump beam source comprises a frequency-doubled laser emitting in the wavelength range of about 4–6 μm.

6. The laser system of claim 5, comprising a $CdGeAs_2$ crystal in the path of the pump beam, between the pump beam source and the optical cavity.

7. The laser system of claim 1, wherein the pump beam source comprises a frequency-doubled $CO_2$ laser.

8. The laser system of claim 7, comprising a frequency altering crystal constructed and arranged to alter the frequency of the pump beam before said beam enters the optical cavity.

9. The laser system of claim 1, wherein the pump beam source supplies a beam to the optical cavity having a wavelength of about 5.3 μm.

10. The laser system of claim 9, comprising a $CdGeAs_2$ crystal in the path of the pump beam, between the pump beam source and the optical cavity.

11. An optical parametric oscillator comprising:
    a first mirror having an outer surface and an inner surface;
    a second mirror having an inner surface optically facing the inner surface of the first mirror and an outer surface on the opposite side thereof; and
    an optical axis existing between the inner surfaces of the first and second mirrors;
    at least one $CdGeAs_2$ crystal having a crystalline axis in said optical axis and mounted so that the crystalline axis can be rotated with respect to the optical axis;
    the first mirror constructed and arranged to permit beams incident on the outer surface of at least selected wavelengths to pass through the first mirror and into the crystal and the second mirror constructed to permit beams of selected wavelengths incident on the inner surface thereof to at least partially pass therethrough and to substantially reflect beams of other wavelengths.

12. The optical parametric oscillator of claim 11, wherein the crystal exhibits an optical loss of intensity of less than about 0.1 $cm^{-1}$.

13. A laser system, comprising:
    an optical parametric oscillator, comprising a resonant optical cavity having an optical axis;
    a pump beam source constructed and arranged to emit a pump beam into the resonant optical cavity, along the optical axis thereof;
    at least one nonlinear crystal having a crystalline axis and capable of producing parametric oscillations, positioned in the optical axis of the cavity in such a manner that the at least one nonlinear crystal can be rotated in the plane containing the optical axis of the cavity and the crystalline axis of the at least one crystal and tune beams emitted by the optical parametric oscillator to multiple frequencies within the about 7 to 18 μm band.

14. The laser system of claim 13, wherein the optical parametric oscillator can emit waves substantially continuously across the about 7 to 18 μm band.

15. The laser system of claim 14, wherein the optical parametric oscillator comprises a CGA crystal in the optical cavity.

16. The laser system of claim 13, wherein the optical parametric oscillator can emits waves substantially continuously across the range of about 8 to 12 μm.

17. The laser system of claim 13, wherein the optical parametric oscillator comprises a CGA crystal in the optical cavity.

18. A method of determining the identity of molecules, comprising shining a beam from an optical parametric oscillator containing a CGA crystal in the optical cavity thereof through the molecules, changing the orientation of the crystal within the cavity to tune the frequency of the beam to frequencies within the range of about 7 to 18 μm and analyzing the spectra of the beam after passing therethrough.

19. The method of claim 18, wherein the beam is tuned within the range of about 8 to 12 μm.

20. A laser system comprising:

an optical parametric oscillator, comprising a resonant optical cavity having an optical axis;

a pump beam source constructed and arranged to emit a pump beam into the resonant optical cavity along the optical axis thereof;

at least one $CdGeAs_2$ crystal having a crystalline axis and capable of producing parametric oscillations, positioned in the optical axis of the cavity in such a manner that the at least one $CdGeAs_2$ crystal can be rotated in the plane containing the optical axis of the cavity and the crystalline axis of the at least one crystal;

wherein the at least one $CdGeAs_2$ crystal can tune the wavelength of a coherent beam exiting the cavity substantially continuously over a range of about 7.5 to 16 $\mu$m, and wherein the at least one nonlinear crystal exhibits an optical loss of intensity of less than about 0.1 $cm^{-1}$ and wherein the pump beam source comprises a laser emitting in the wavelength range of about 4–6 $\mu$m.

21. The laser system of claim 20, wherein the pump beam source comprises a frequency doubled $CO_2$ laser.

22. The laser system of claim 21 wherein the emission wavelength of the pump beam is about 5.3 $\mu$m.

23. The laser system of claim 21 comprising a frequency altering crystal constructed and arranged to alter the frequency of the pump beam before said beam enters the optical crystal.

24. The laser system of claim 21 comprising a $CdGeAs_2$ crystal in the path of the pump beam, between the pump beam source and the optical cavity.

* * * * *